Jan. 17, 1950     G. BOUCHET     2,494,607
OPTICAL PYROMETER
Filed Dec. 29, 1945     3 Sheets-Sheet 1
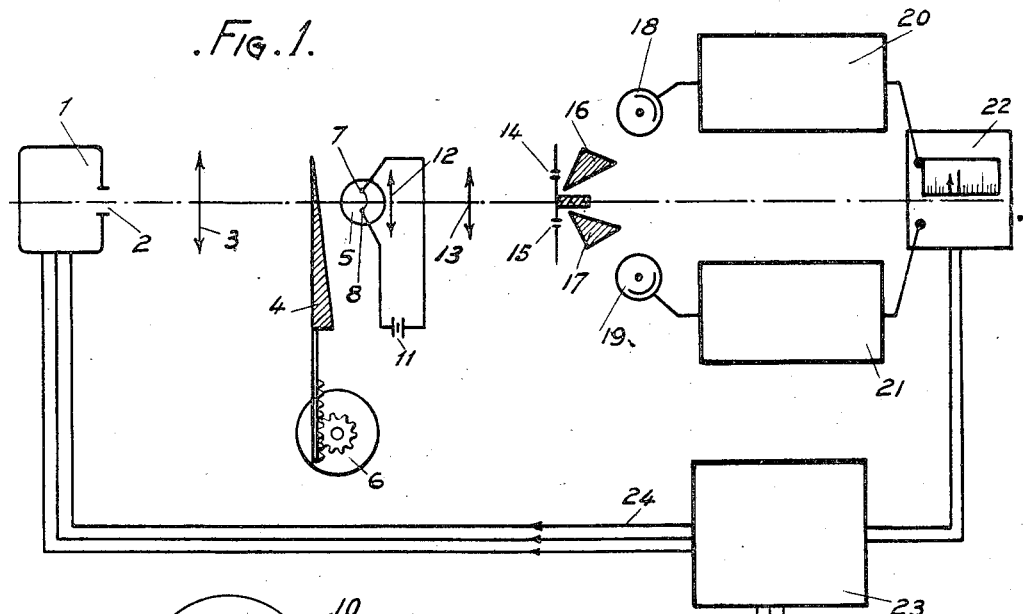
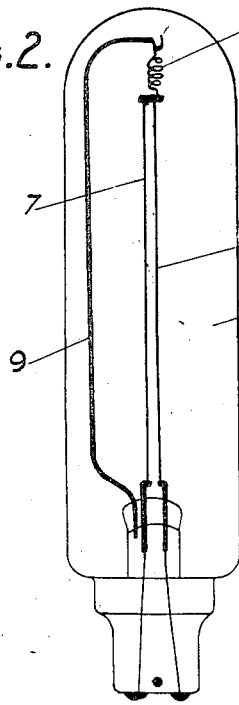
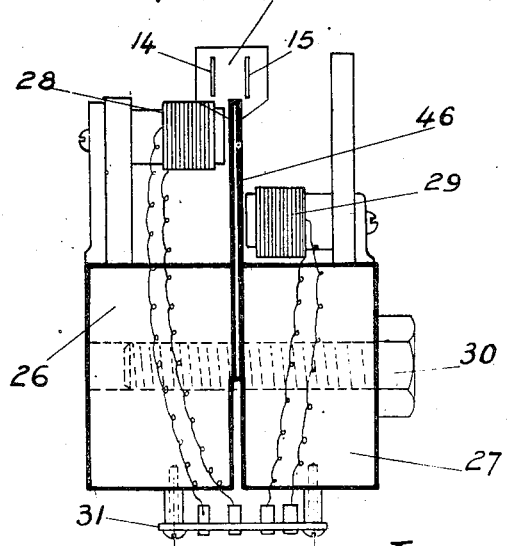
INVENTOR
GEORGES BOUCHET
by his attorneys
Howson and Howson.

Jan. 17, 1950 G. BOUCHET 2,494,607
OPTICAL PYROMETER
Filed Dec. 29, 1945 3 Sheets-Sheet 3

INVENTOR
GEORGES BOUCHET
by his attorneys
Howson and Howson.

UNITED STATES PATENT OFFICE 2,494,607

OPTICAL PYROMETER

Georges Bouchet, Bellevue, France, assignor to Societe "Quartz & Silice," Paris, France, a corporation of France Application December 29, 1945, Serial No. 638,332
In France June 7, 1944

2 Claims. (Cl. 236—15)

For the measurement of temperatures, optical pyrometers have been used essentially including, on the one hand a comparison or reference lamp fed with current from a battery, and, on the other hand, a lens system forming, in the plane of the lamp filament, an image of the source of heat to be studied. The operator's eye is utilized for appreciating equality of brilliance between the source and the filament of the comparison lamp.

The operator's eye appreciates this equality in space, that is to say it registers what contrast may exist between the brilliancy of the filament of the lamp, which is superposed on the image of the source and the brilliancy of the image of the source in the portion thereof that is not covered by said filament. The operator then acts, either on the current flowing through the comparison lamp filament or on the position of a wedge-shaped light absorbing screen interposed between the source and the comparison lamp so as to obtain equality of the respective brilliancies above mentioned. The temperature is read, for instance, either on a milli-ammeter inserted in the circuit of the comparison lamp, or on a graduated drum movable in synchronism with the displacements of the wedge-shaped screen.

The object of the present invention is to provide an optical pyrometer which is more accurate and more reliable that those of the type above referred to.

According to an essential feature of the present invention, instead of depending upon the operator's eye for comparing brilliancies as above set forth, photoelectric means are provided across the respective paths of light rays emitted from the comparison lamp filament and from the image of the source of heat for transforming differences of brilliance between said filament and said image into alternating currents, so that brilliance is indicated by the fact that the alternating current is zero.

It is known that any photoelectric cell delivers an electric current the value of which corresponds to the value of the luminous energy applied to said cell, and that very small variations of this luminous energy produce an alternating current in the output circuit of the cell. If, therefore, a photoelectric cell is alternatingly subjected to the action of a portion of the image of the source and of the comparison lamp filament, an alternating current will be produced in the output circuit of said cell as long as there is a difference between the brilliance of the filament and that of the image of the source of heat. When equality of brilliance is obtained, no alternating current flows through said circuit. The temperature of the source of heat, for instance a furnace, is then equal to that of the filament. It is possible to have the feed of energy to the furnace controlled by the pyrometer if the alternating current is fed to amplifiers, through known electrical and mechanical devices, such as rectifiers, a zero galvanoscope, temperature regulating means, a circuit breaker, valve means, etc.

The pyrometer according to the invention may also be adapted to permit the instantaneous reading or the recording of a varying temperature. For this purpose, according to another feature of the present invention, the zero galvanoscope includes means for the adjustment of the apparatus itself, and the displacements of said adjustment means are utilized for the recording of the temperature.

Other features of the invention will result from the following detailed description.

Preferred embodiments of the invention will be hereinafter described with reference to the accompanying drawings, given merely by way of example, and in which:

Fig. 1 is a general diagram of a pyrometric system for the regulation of a furnace;

Fig. 2 is a detailed view of a double filament comparison or reference lamp;

Fig. 3 is a detailed view of a vibrating slot device for creating in each photo-electric cell an alternating current;

Figure 4:
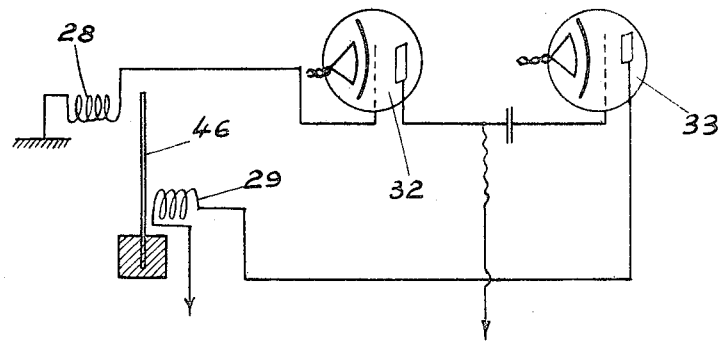
Fig. 4 is an electric wiring diagram corresponding to the device for feeding current to the vibrating slot device.

Fig. 1 illustrates a pyrometric system for the automatic regulation of a furnace 1, with its aperture at 2. A lens system 3 gives an image of the light source constituted by this aperture. A grey wedge-shaped screen 4 is interposed between lens 3 and this image, the image being formed in the plane of the two filaments of a comparison lamp 5. The position of wedge-shaped screen 4 is controlled by a drum 6. Lamp 5 is fitted with two filaments, 7 and 8 respectively, as shown by Fig. 2. These filaments, for instance of tungsten, are supported by a bent rod 9, for instance through a spring 10 by means of which they are suitably tensioned. Filaments 7 and 8 are fed in series with a current of constant value supplied by a source 11. Their respective cross-sections are slightly different from each other so that the constant current in question brings them to temperatures $t$ and $t'$ slightly different from each other, for instance by 10°.

Behind lamp 5 is disposed a field lens 12 which transforms the light beam into a more convergent beam. Another lens 13 forms images of source 2 and filaments 7 and 8 in the plane of slots 14 and 15. The plate in which said slots are made is given a vibratory motion which causes each of said slots to coincide alternately with the image of one of the filaments (which corresponds with the slot) and with the image of the source of heat. Consequently, if the brilliancies of the image of the source and of the image of the filament that is being considered are different, an alternating current is produced in the output circuit of the corresponding photoelectric cell. Prisms 16 and 17 direct the images formed in slots 14 and 15 toward photo-electric cells 18 and 19 respectively. The output circuits of these respective cells include the amplifying and detecting stages 20—21, respectively, branched on a regulating device 22 mounted to work as a zero galvanoscope. This zero galvanoscope is arranged to control a power relay such as a circuit breaker 23 inserted in the feed circuit 24 of the furnace from the distribution network 25.

As shown by Fig. 3, the vibrating slots 14 and 15 are formed in a plate 45 mounted on a flat steel rod 46 tightly held between two pieces 26—27 assembled by a bolt 30. On these pieces 26 and 27 are mounted two respective electro-magnets 28 and 29 acting on rod 46. The windings of these electro-magnets, connected to contacts carried by a plate 31, are fed in the following manner (Fig. 4):

Electro-magnet 28 is inserted in the grid circuit of a first tube 32 the plate of which acts on the grid of a second tube 33. The plate of this tube 33 feeds current to the winding of electro-magnet 29. This arrangement constitutes a vibratory system the frequency of which is imposed by the mechanical characteristics of the vibrating blade 46. Besides, this frequency need not be constant.

Figure 5:
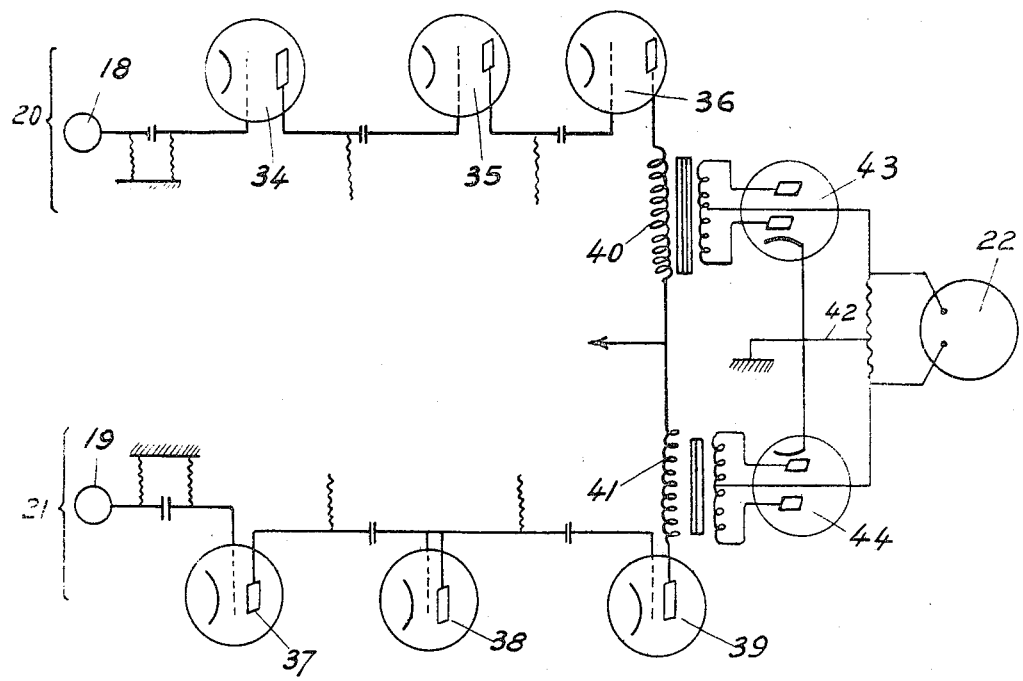
Fig. 5 is a simplified diagram illustrating the arrangement of the amplifying and detecting means of the galvanoscope.

As shown by Fig. 5, photoelectric cell 18 is provided at its output with a plurality of amplifier tubes 34—35—36. In a like manner, photoelectric cell 19 is provided at its output with amplifier tubes 37—38—39. The alternating currents supplied by each amplifier are rectified by tubes 43—44 (diode tubes) and opposed to each other in resistance 42. Across the terminals of resistance 42 is mounted a regulating galvanoscope 22 of a well known type.

Figure 6:
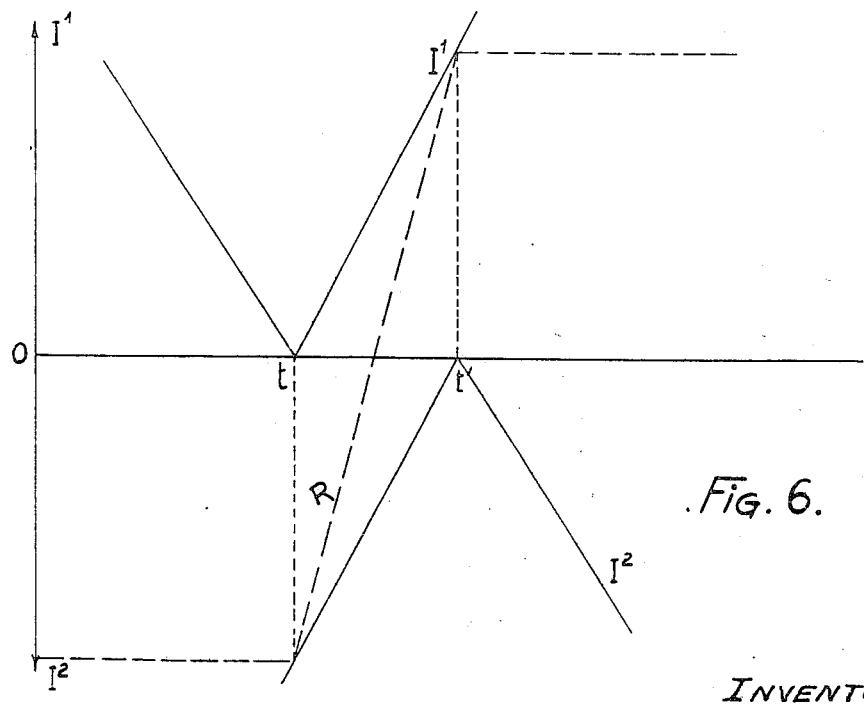
Fig. 6 is a diagram of the currents obtained from the photoelectric cells.

This device works in the following manner:

If it is supposed that drum 6, which controls the grey tinted wedge-shaped screen, indicates a certain adjustment temperature, in the course of the rise of temperature of the furnace, the current $I^1$ supplied by the cell corresponding to the darker filament first becomes zero. The current $I^2$ supplied by the other cell (corresponding to the filament of lighter shade) also decreases as the temperature of the furnace, rises, and becomes zero for a temperature 10° above that corresponding to the zero value of current $I^1$. These alternating currents $I^1$ and $I^2$, suitably amplified and rectified by the stages above described, give direct currents opposed in apparatus 22. Their resultant is represented by R, and its sign changes for a point of the abscissas line located between $t$ and $t'$ (Fig. 6).

This is due to the fact that, as the furnace temperature rises, each of the rectified currents first decreases, becomes zero, then increases, the zero values corresponding respectively to temperatures differing from each other by 10°. The adjustment temperature is located between temperatures $t$ and $t'$ and can vary but very little if the curves of sensitivity of the cells and the amplifiers do not vary too much in the course of the time.

The position of equilibrium of the needle of galvanoscope 22 is adjusted to the middle of the apparatus. If the furnace is too cold, a deflection takes place for instance toward the left or, if the furnace is too hot, toward the right. This galvanoscope acts on relays 23 for switching off and on the feed of the furnace.

Modifications can be made for the production of alternating currents in the photo-electric cells. For instance, instead of causing slots 14 and 15 to vibrate, it is possible to impart the vibrations to filaments 7 and 8 themselves. These filaments may vibrate either inside a common bulb or inside two separate bulbs respectively. It is also possible to impart the vibrations in question to the lamps themselves.

As another modification, instead of making use of the differential arrangement with two cells 18 and 19 as just above described, it is possible (in order to establish a difference between the conditions corresponding to too hot a furnace and those corresponding to too cold a furnace) to make use of only one cell and one filament. In that event I use: either a relay which works only every second time or an arrangement making use of a neon tube in series with the cell in such manner that no current can flow when the furnace is too cold and the light flux received by the cell is too small for permitting the neon lamp to work.

An advantage of the regulators according to the invention is that their accuracy of operation does not substantially vary in the course of time because the adjustment temperature can vary but very little, between two temperatures which are determined in a perfectly fixed manner by the two comparison or reference filaments.

Figure 7:
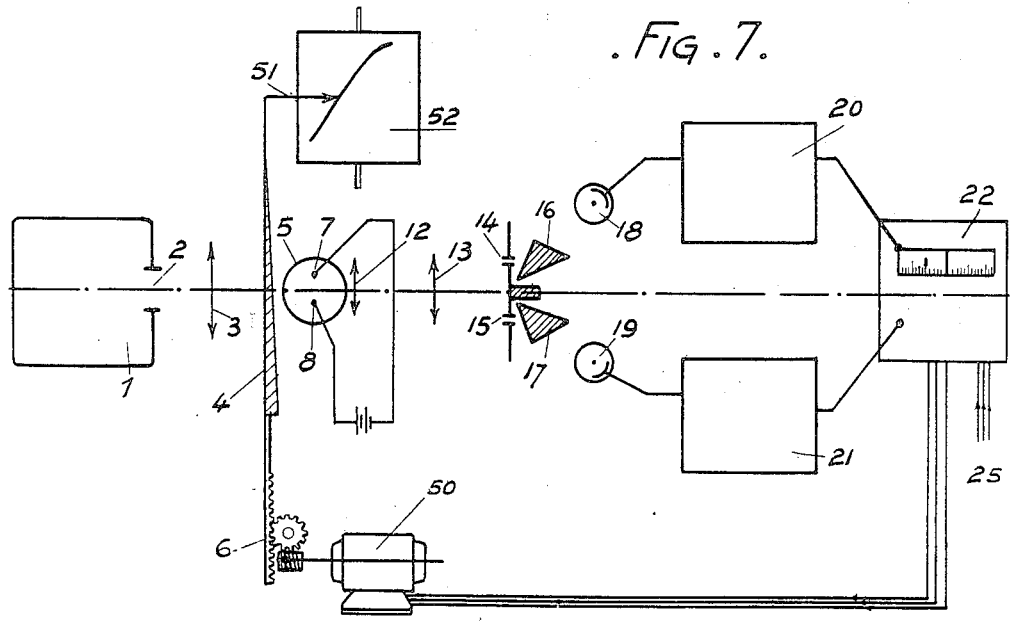
Fig. 7 is a general view, similar to Fig. 1, showing another embodiment of the invention, adapted to permit the recording of the temperatures of a furnace.

In Fig. 7, which relates to a second embodiment of the device according to the invention, the reference numerals already used in Fig. 1 designate the same elements.

In this second embodiment, the movement of wedge-shaped screen 4 is transmitted from a motor 50 in such manner that, when the galvanoscope is deviated in one direction or the other, motor 50 turns in one direction or the other, thus modifying the position of wedge-shaped screen 4.

A pointer 51 rigid with respect to wedge-shaped screen 4 indicates the temperature. The device may further include, as shown by the drawing, a recording drum 52 on the paper of which the displacements of point 51 are marked.

I might of course make use of any other arrangement for adjusting the comparison current flowing through filaments 7 and 8 by means of the zero galvanoscope and indicating the value of this current by means of a needle movable in front of a dial provided with a graduation directly indicating the temperature values, or of a recording device.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In combination, for the regulation of the temperature of a furnace, a comparison lamp including two incandescent filaments heated to different temperatures the one from the other, optical means for forming, adjacent to said filaments, an image of the incandescent inside of said furnace, two photo-electric cells, an opaque screen provided with two slots parallel to the filaments of the lamp, means for vibrating said slotted screen transversely to the slots, means for continuously subjecting each of said cells to the alternating luminous actions of said image and one of said filaments, an electric circuit connected to the output of each of said cells and electric means fed by the said circuits for regulating the feed of energy to said furnace in accordance with the temperature thereof.

2. In combination, for the regulation of the temperature of a furnace, a comparison lamp including two incandescent filaments heated to different temperatures the one from the other, optical means for forming, adjacent to said filaments, an image of the incandescent inside of said furnace, two photo-electric cells, an opaque screen provided with two slots parallel to the filaments of the lamp, means for vibrating said slotted screen transversely to the slots, means for continuously subjecting each of said cells to the alternating luminous actions of said image and one of said filaments, an electric circuit connected to the output of each of said cells, rectifiers in said circuits, and electric means fed in opposition by the rectified currents from said circuits respectively, for regulating the feed of energy to said furnace in accordance with the temperature thereof.

GEORGES BOUCHET.

REFERENCES CITED

The following references are of record in the file of this patent:

UNITED STATES PATENTS

| Number | Name | Date |
| --- | --- | --- |
| 975,949 | Henwood | Nov. 15, 1910 |
| 1,387,240 | Collis | Aug. 9, 1921 |
| 1,475,365 | Schueler et al. | Nov. 27, 1923 |
| 1,672,671 | Young | June 5, 1928 |
| 1,743,792 | Moeger | Jan. 14, 1930 |
| 1,788,849 | Schunemann | Jan. 13, 1931 |
| 1,970,103 | Runaldue | Aug. 14, 1934 |
| 1,976,461 | Prince | Oct. 9, 1934 |
| 2,096,323 | Gille | Oct. 19, 1937 |
| 2,244,732 | Schmitt | June 10, 1941 |
| 2,349,656 | Gullicksen | May 23, 1944 |
| 2,402,926 | Herschman | June 25, 1946 |

FOREIGN PATENTS

| Number | Country | Date |
| --- | --- | --- |
| 346,620 | Great Britain | Apr. 16, 1931 |